(12) United States Patent
Orlamünder

(10) Patent No.: US 6,311,816 B1
(45) Date of Patent: Nov. 6, 2001

(54) PRESSURE PLATE HOUSING FOR CONNECTION TO AN INERTIA MASS

(75) Inventor: Andreas Orlamünder, Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 09/454,161

(22) Filed: Dec. 9, 1999

(30) Foreign Application Priority Data

Dec. 10, 1998 (DE) ............................................. 198 56 904
Nov. 27, 1999 (DE) ............................................. 199 57 219

(51) Int. Cl.$^7$ .................................................... F16D 13/58
(52) U.S. Cl. ......................................... 192/112; 192/70.16
(58) Field of Search .................................. 192/112, 70.16

(56) References Cited

U.S. PATENT DOCUMENTS

| | | | |
|---|---|---|---|
| 2,079,888 | * 5/1937 | Wemp | 192/112 |
| 3,213,987 | * 10/1965 | Cook | 192/112 X |
| 3,670,859 | * 6/1972 | Schiefer et al. | 192/112 |
| 5,713,449 | 2/1998 | Schubert | 192/70.19 |

FOREIGN PATENT DOCUMENTS

| | | | |
|---|---|---|---|
| 2 042 419 | 3/1972 | (DE) | F16D/13/64 |
| 34 22 726 | 1/1985 | (DE) | F16D/13/60 |
| 40 14 470 | 11/1991 | (DE) | F16D/13/60 |
| 43 08 613 | 9/1993 | (DE) | F16D/13/64 |
| 43 09 570 | 9/1993 | (DE) | F16D/13/38 |
| 43 31 454 | 3/1994 | (DE) | B21J/5/00 |
| 44 15 482 | 11/1994 | (DE) | F16D/13/70 |
| 196 36 398 | 3/1997 | (DE) | F16D/13/60 |
| 2211563 | * 7/1989 | (GB) | 192/112 X |
| 3-157521 A | * 7/1991 | (JP) | 192/112 X |

* cited by examiner

Primary Examiner—Richard M. Lorence
(74) Attorney, Agent, or Firm—Cohen, Pontani, Lieberman & Pavane

(57) ABSTRACT

A pressure plate housing for a clutch of a motor vehicle includes a housing cover and a housing wall integrally produced from sheet metal. Sleeves are arranged in the housing wall that have recesses designed for receiving connecting elements. The pressure plate housing has particularly small radial dimensions and can be produced very cost-effectively.

4 Claims, 8 Drawing Sheets

FIG.9
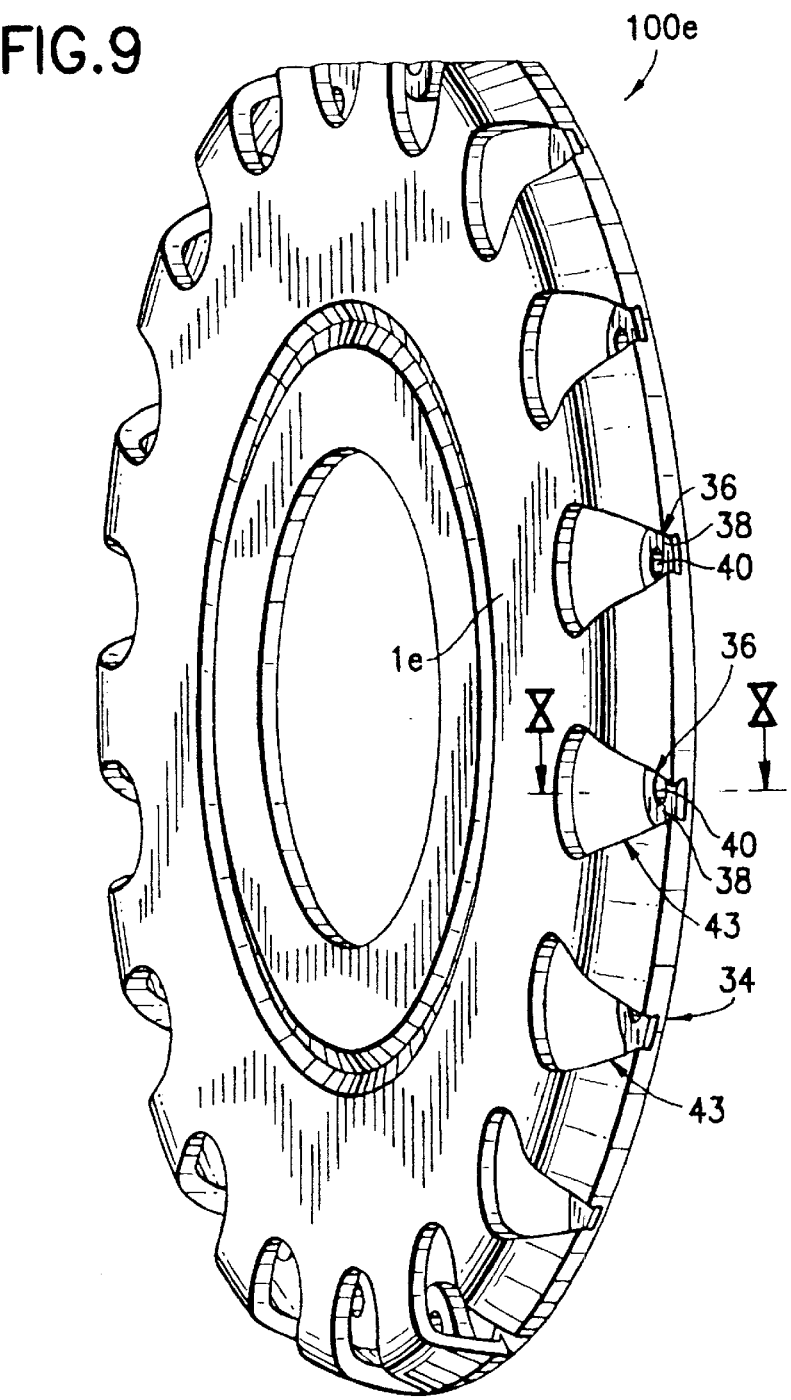
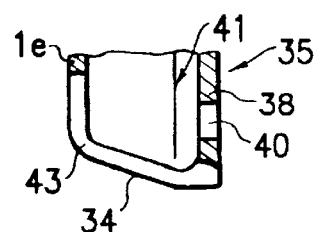
FIG.10

PRESSURE PLATE HOUSING FOR CONNECTION TO AN INERTIA MASS

BACKGROUND OF THE INVENTION

1. Field of the Invention

The invention relates to a pressure plate housing for connection to an inertia mass in a clutch of a motor vehicle having a disk-shaped housing cover and a housing wall integrally produced from formed sheet metal, wherein the housing wall projects from the disk-shaped housing, is supportable on the inertia mass, and has recesses for receiving connecting elements.

2. Description of the Related Art

A prior art pressure plate housing is known, for example, from DE 43 13 507 A1 that is completely produced from deep-drawn sheet metal and possesses, in its housing cover close to the housing wall, a ring of recesses through which the connection elements, i.e., screws, are guided during assembly. A center of the housing cover has an aperture through which a thrust device of the clutch is extendable. The inertia mass has threaded holes to receive the screws. In the installed state, the free end of the housing wall of the pressure plate housing is prestressed against the inertia mass by the screws or other connection elements. An advantage of the pressure plate housing that is integrally produced from deep-drawn sheet metal is the particularly cost-effective production and high elasticity compared to a pressure plate housing produced by injection molding.

A disadvantage of the known pressure plate housing is that a distortion-free installation on the inertia mass is very demanding because even slight deviations in the prestress of the connection elements produces a heavy flexural stressing of the housing wall. Furthermore, the known pressure plate housing has very large radial dimensions.

SUMMARY OF THE INVENTION

The object of the present invention is to design a pressure plate housing having a housing cover and a housing wall integrally produced from formed sheet metal such that the pressure plate housing can be installed as simply as possible without distortion.

The object of the present invention is achieved by a pressure plate housing having a housing cover and a housing wall, wherein the housing wall is designed recesses for receiving the connection elements.

As a result of this design, the recesses for the connection elements are arranged outside the housing cover. Therefore, the housing wall is not flexurally stressed even with slightly different prestressing of the connection elements. Furthermore, the housing cover according to the present invention does not absorb any prestress forces of the connection elements. Accordingly, the pressure plate housing according to the present invention is simple to install without distortion. If the recesses for the connection elements are arranged in the housing wall, the radial dimensions of the pressure plate housing may be kept particularly low. Moreover, the use of a large number of connection elements of small dimensions instead of a small number of connection elements of large dimensions facilitates further reduction of the radial dimensions of the pressure plate housing according to the present invention. Frictional fitting of the connecting elements, i.e., screws, in the recesses further facilitates the assembly of the pressure plate housing according to the present invention.

To further reduce the risk of distortion of the housing wall, the housing wall may possess flanges designed to rest on the inertia mass, wherein one of the recesses extends through each of the flanges. In this embodiment, the connection elements prestress the flanges against the inertia mass, so that no forces are transmitted into the housing wall or into the housing cover.

The pressure plate housing according to the present invention has particularly small dimensions if a neutral portion of the projecting edge of the housing wall is oriented to point to the center of the flange. Furthermore, the pressure plate housing according to this embodiment has particularly high stability as a result.

The flanges, according to another embodiment of the present invention, may be produced integrally with the housing wall particularly cost-effectively if the flanges are arranged on tongues angled downward from the housing wall.

To further increase the stability of the pressure plate housing according to the present invention, it is helpful if the tongues possess a common collar designed to rest on the inertia mass. In this embodiment, the collar forms a bead which protects the housing wall, especially during transport. As a result, the housing wall may be of particularly thin-walled design.

To further reduce the radial dimensions of the pressure plate housing according to the present invention, the housing wall is arranged perpendicularly to the housing cover and the recesses are arranged within the housing wall. The pressure plate housing according to this embodiment of the present invention may, for example, be drop-forged for this purpose.

The pressure plate housing according to another embodiment of the present invention may be produced particularly cost-effectively if the housing wall possesses a plurality of sheet metal strips angled downward from the housing cover.

Furthermore, the pressure plate housing installed into a clutch permits reliable cooling of the pressure plate combined with especially inexpensive design if the plural sheet metal strips are mutually spaced apart.

According to another embodiment of the present invention, the recesses may be arranged particularly cost-effectively on the sheet metal strips if a partial region of the sheet metal strips is bent to form a sleeve comprising one of the recesses. The sleeve may thus be designed like a strap hinge.

According to another embodiment of the present invention, the recesses for receiving the connection elements may be produced particularly cost-effectively if a partial region of the sheet metal strips is arranged in an encompassing design for the partial lateral delimitation of one of the recesses. As a result, the metal strip only needs, for example, an angle or a U-shaped bend in the region of the recess. This design further contributes to a particularly economical use of material and hence to a light weight of the pressure plate housing according to the invention.

The pressure plate housing according to the present invention is of particularly light weight if the sheet metal strip is designed to taper toward the end of the sleeve remote from the housing cover.

According to another embodiment of the present invention, a large number of recesses may be arranged on the housing wall by arranging one sleeve on each of the two sides of the sheet metal strips. The use of a large number of sleeves allows particularly thin connection elements to be employed. As a result, the connection of the pressure plate housing according to the present invention to the inertia mass becomes particularly rigid, since two connection elements each prestress one of the angled sheet metal strips onto the inertia mass.

Cooling air may be passed under the pressure plate housing according to the invention, in a particularly inexpensive design, if the sheet metal strips are each arranged to extend in the circumferential direction from a radially outer position toward a radially inner position. The result of this arrangement is that the sheet metal strips function as a simple form of fan blades so that the cooling air is conveyed in a radial direction when the pressure plate housing according to the invention is rotated.

The conveyance of the cooling air under the pressure plate housing according to the present invention may be inexpensively effected by arranging the recesses for the connection elements located on both sides of the sheet metal strips on different partial circles.

Forces transmitted into the pressure plate housing according to the invention, in the installed state, may be simply supported on the inertia mass if the housing wall comprises sheet metal strips with radially directed bent-over tabs arranged on the circumferential sides of the sheet metal strips that laterally encompass the recesses and are designed to be supported on the inertia mass and on the housing cover. As a result, the housing wall has very large radial dimensions because of the bent-over tabs, thereby reliably avoiding the transmission of bending forces into the housing cover.

A torque may be transmitted from the pressure plate housing according to the present invention to the inertia mass in a particularly inexpensive construction if the housing wall is designed to be radially prestressed against a correspondingly designed shoulder of the inertia mass.

According to another embodiment of the present invention, the transmission of the torque to the inertia mass requires a particularly inexpensive construction if the housing wall possesses a circumferential edge for prestressing against the shoulder of the inertia mass.

The pressure plate housing according to the present invention has a particularly high stability if the sheet metal strips are connected to one another across the circumferential edge.

To further increase the stability of the pressure plate housing according to the present invention, the housing cover may possess a circumferential molding in its radially inner region. A membrane spring may additionally be supported in the region of the circumferential molding.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawing, wherein like reference characters denote similar elements throughout the several views:

FIG. 9 is a perspective view of a pressure plate housing according to another embodiment of the present invention with flanges arranged on individual tongues;

FIG. 10 is a sectional view through the pressure plate housing according to FIG. 9 along the line X—X;

DETAILED DESCRIPTION OF THE PRESENTLY PREFERRED EMBODIMENTS

Figure 1:
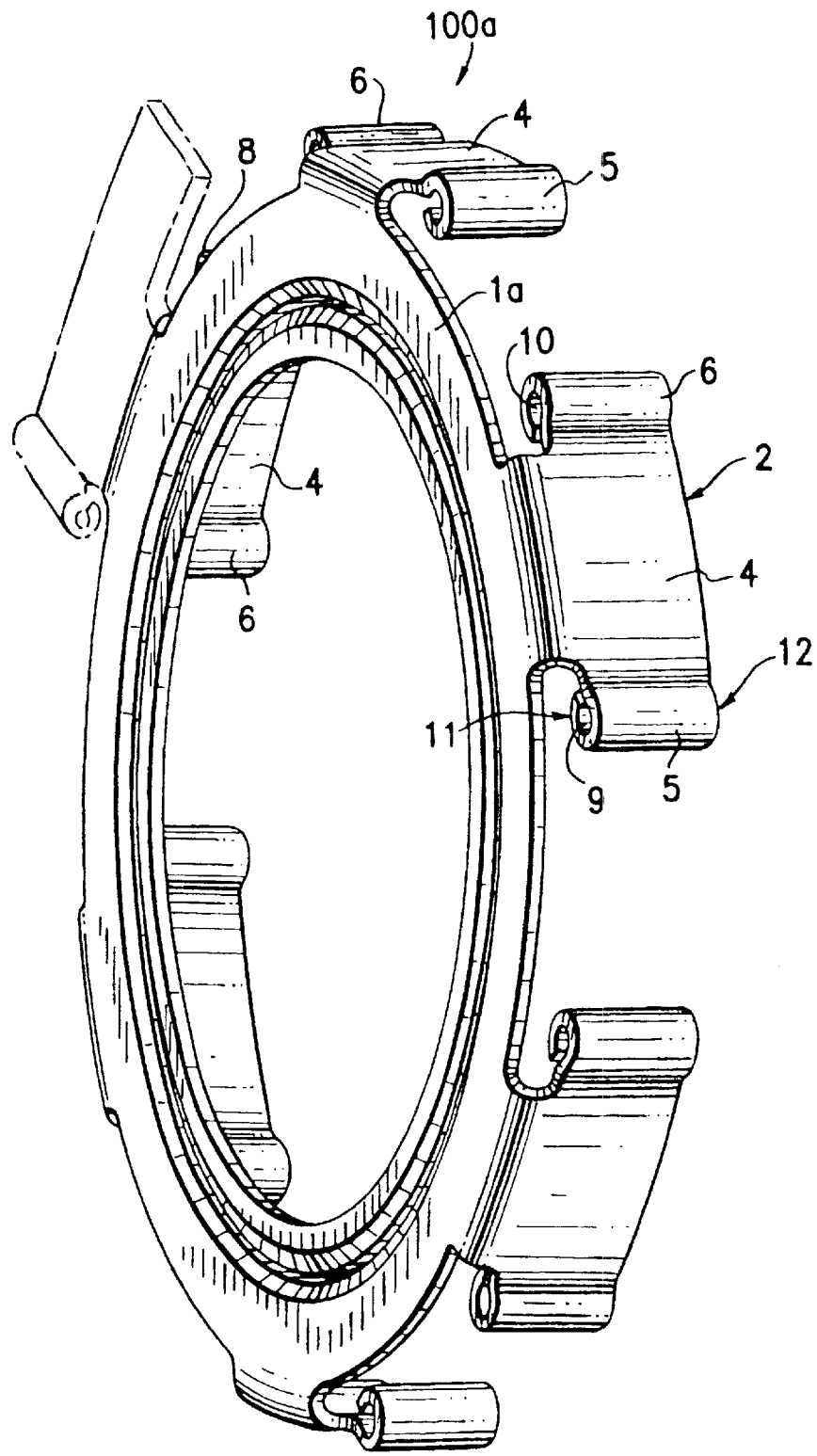
FIG. 1 is a perspective view of a pressure plate housing according to an embodiment of the present invention with sleeves arranged in pairs on sheet metal strips.

FIG. 1 shows a pressure plate housing 100a for connection to an inertia mass (not shown) of a motor vehicle clutch according to an embodiment of the present invention. The pressure plate housing 100a has a housing cover 1a and a housing wall 2 projecting perpendicularly from the housing cover 1a. The housing wall 2 comprises a plurality of sheet metal strips 4. Two sleeves 5, 6 are arranged on each of the sheet metal strips 4. The sleeves 5–6 each have a recess 9, 10 through their center. The recesses 9, 10 receive connection elements (not shown) by means of which the pressure plate housing 100a may be prestressed against the inertia mass (likewise not shown) of the motor vehicle clutch. The connection elements may, for example, comprise screws or rivets. End faces 11 on sides of the sleeves 5, 6 near to the housing cover 1a support a head of the connection element while end faces 12 remote from the housing cover 1a are designed to rest against the inertia mass. In this embodiment, the connection elements are arranged to use the smallest space possible in the housing wall 2 so that little or no contribution to the radial dimensions of the pressure plate housing 100a is made according to the present invention. Also, the sheet metal strips 4 are mutually spaced apart along the circumferential direction, so that cooling air can flow into the pressure plate housing 100a.

The upper left portion of FIG. 1 also shows, in broken lines, the position of one of the sheet metal strips 4 during the production of the pressure plate housing 100a. The housing cover 1a may be stamped from a flat metal sheet integrally with the sheet metal strips 4. After the stamping process, the lateral regions of the sheet metal strip 4 are bent, for example, around a round mandrel (not shown), to form the sleeves 5, 6. Furthermore, the sheet metal strips 4 are bent down into position shown in FIG. 1 to form the housing wall 2. The sheet metal strips 4 may be bent into position before or after the bending of the sleeves 5, 6. As a result of the bending about a round mandrel, the sleeves 5, 6 acquire a round cross-section. However, the sleeves 5, 6 may, of course, also be of oval or polygonal design as a result of appropriate bending.

Figure 2:
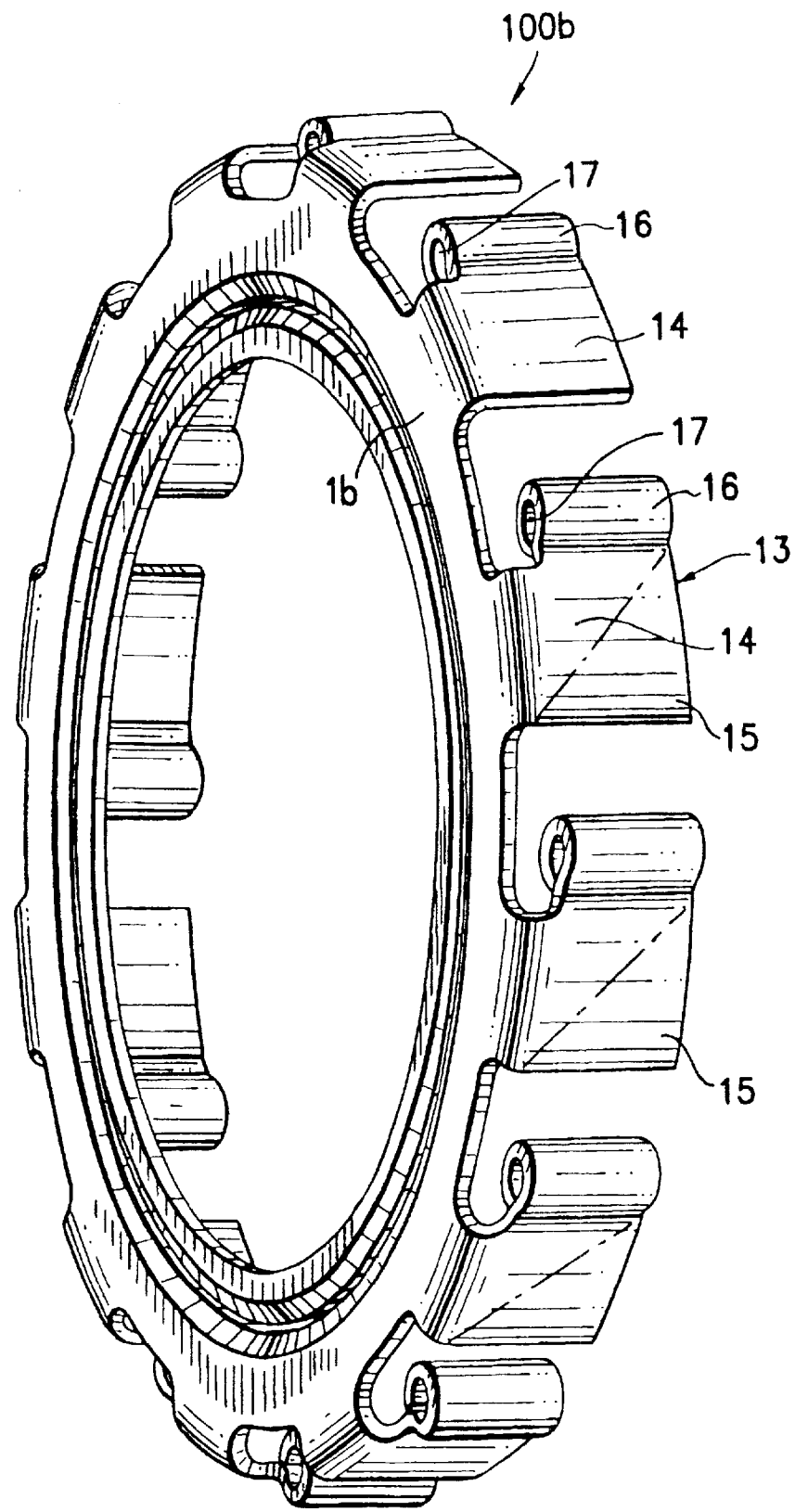
FIG. 2 is a perpsective view of a pressure plate housing according to another embodiment of the present invention with an individual sleeve arranged on each sheet metal strip.

FIG. 2 shows a further embodiment of a pressure plate housing 100b according to the present invention in which a housing wall 13 projecting from a housing cover 1b possesses individual sheet metal strips 14. In contrast to the pressure plate housing 100a shown in FIG. 1, each of the sheet metal strips 14 bears a single sleeve 16. Each single sleeve 16 includes a recess 17 for receiving connection elements. A region of the sheet metal strips 14 remote from the housing cover 1b may be designed to taper radially inward to save weight and to direct cooling air. This optional embodiment is shown in FIG. 1 by broken lines on some of the sheet metal strips 14.

Figure 3:
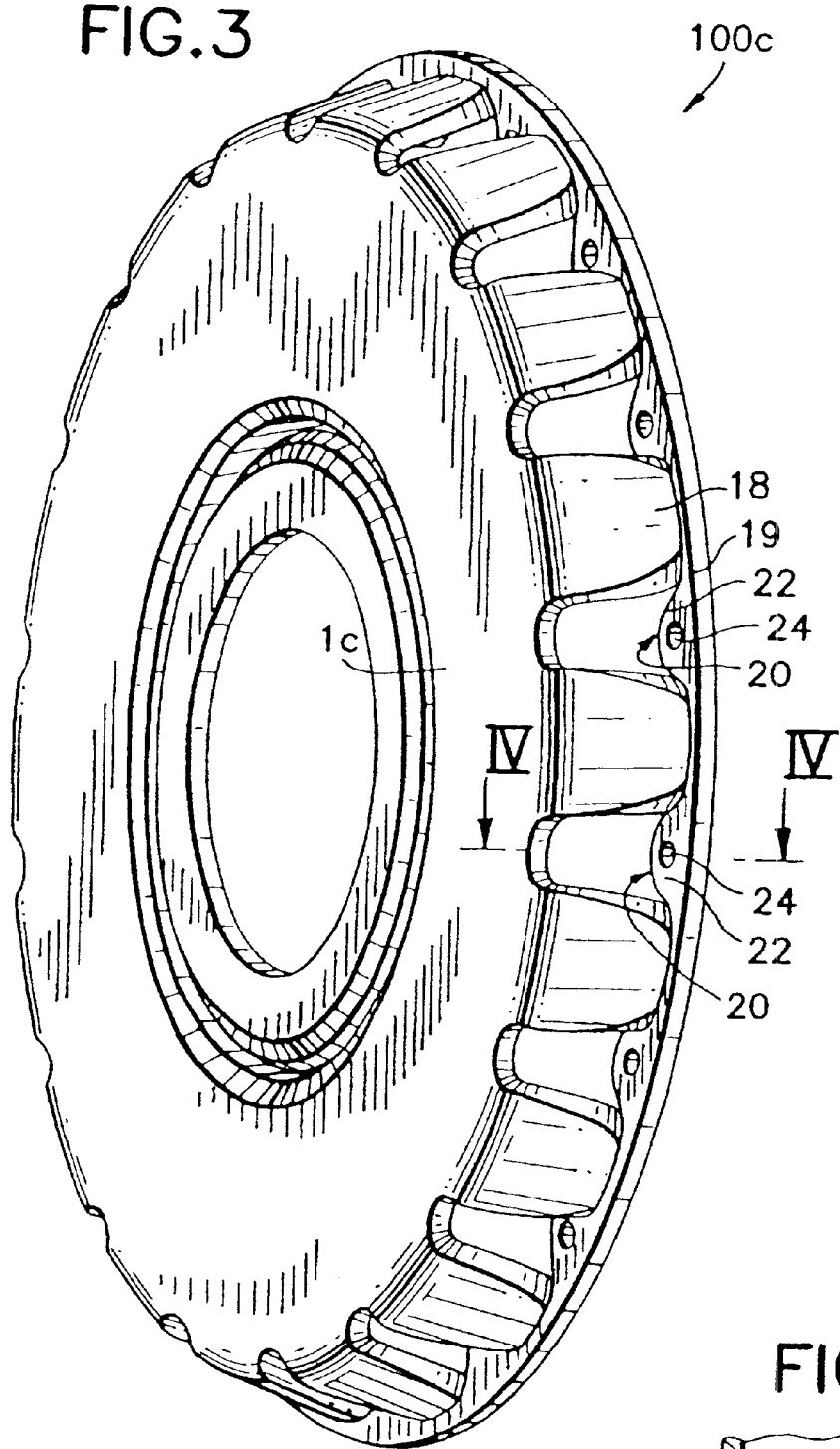
FIG. 3 is a perspective view of a pressure plate housing according to another embodiment of the present invention with a circumferential collar.

FIG. 3 shows a further embodiment of a pressure plate housing 100c according to the present invention in which a housing wall 18 has a collar 19 designed to rest on the inertia mass (not shown) of the motor vehicle clutch. The collar 19 is angled radially outward from the connection to the housing wall 18 and bears a large number of radially inward-pointing tongues 20. The tongues 20 bear flanges 22 with recesses 24 therethrough for allowing insertion of connection elements (not shown).

Figure 4:
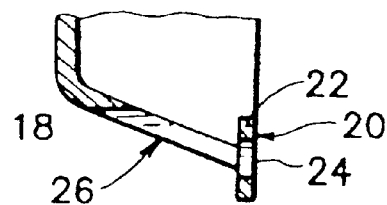
FIG. 4 is a sectional view through a recess in the pressure plate housing according to FIG. 3 along the line IV—IV.

FIG. 4 is a sectional view through the pressure plate housing 100c along the line IV—IV in FIG. 3 showing one of the flanges 22 and the housing wall 18 adjacent thereto. The housing wall 18 is arranged to taper obliquely toward the flange 22. The neutral portion of the housing wall 18 connected to the outer circumference of the housing cover 1c and corresponding to the circumferential area of the flange 22 points to the center of the recess 24. Furthermore, the housing wall 18 has a recess 26 in the region of the flange 23 which is longer than the length of the tongue 21. Accordingly, the pressure plate housing 100c may be formed from a flat sheet.

Figure 5:
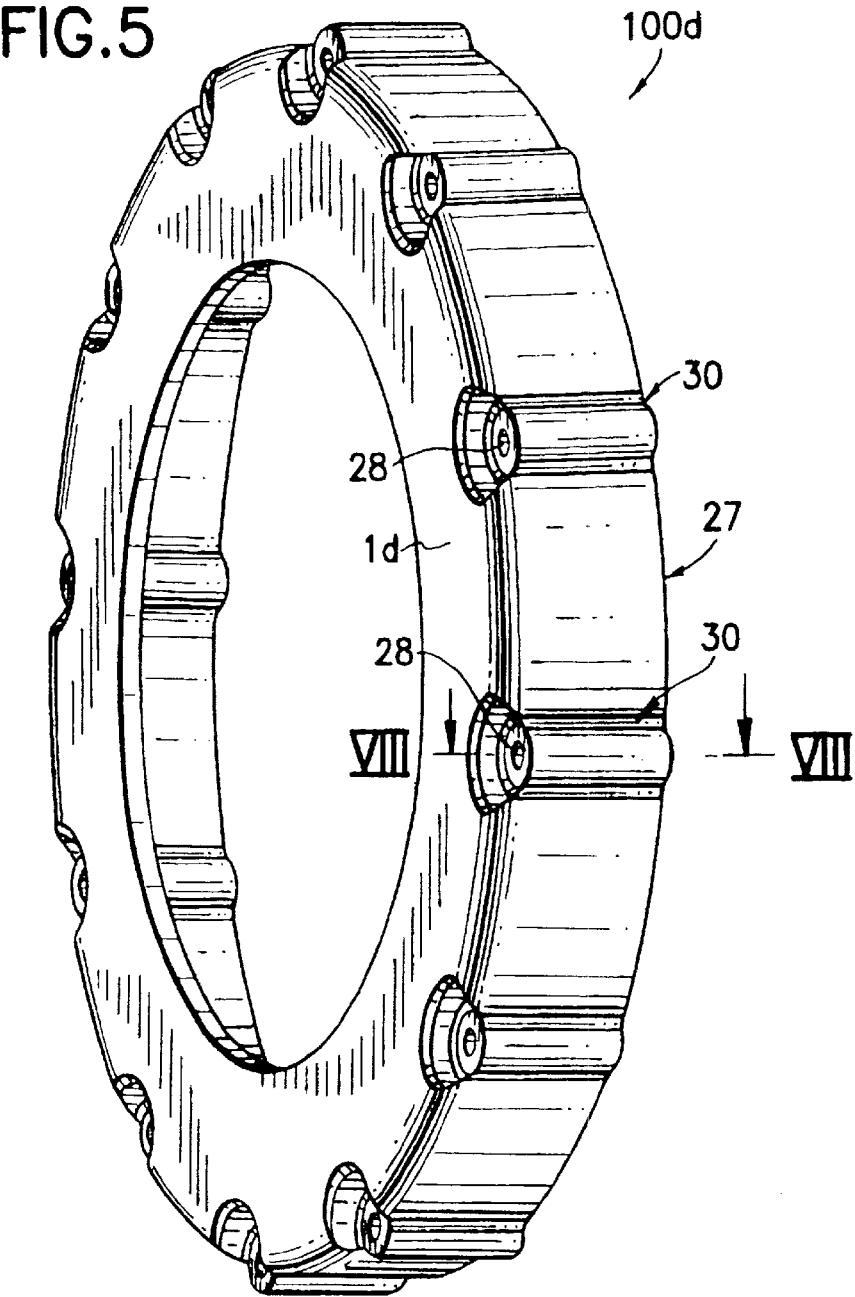
FIG. 5 is a perspective view of a pressure plate housing according to another embodiment of the present invention with recesses arranged in a housing wall.

FIG. 5 shows a further embodiment of a pressure plate housing 100d according to the present invention in which a housing wall 27 is of continuous design and stands vertically on the housing cover 1d. The housing wall 27 is penetrated by recesses 28 designed for connection elements (not shown). The housing wall 27 has perturbations 30 in the regions of the recesses 28 caused by the formation of the recesses 28 through the housing wall 27.

Figure 6:
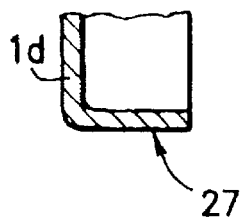
FIGS. 6–7 are sectional views of a housing wall during production of the pressure plate housing of FIG. 5 showing two steps in the method of producing one of the recesses in the pressure plate housing of FIG. 5.
Figures 7, 8:
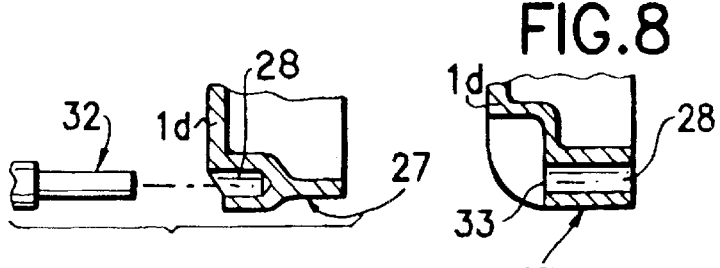
FIG. 8 is a sectional view through the pressure plate housing according to FIG. 5 along the line VIII—VIII.

FIGS. 6 and 7 show the production of one of the recesses 29 in a sectional view through the housing wall 27 and an adjacent region of the housing cover 1d. Initially, as is apparent in FIG. 6, the housing wall 27 and the housing cover 1d are produced, for example, by deep drawing from a flat stamped disk of sheet metal. The pressure plate housing 100d may then placed in a mold (not shown) designed as a steadying device. As shown in FIG. 7, the recess 28 is pressed into the housing wall 27 via an appropriately designed mandrel 32. The pressure plate housing 100d may optionally be heated during formation of the recess 28 for ease of forming.

FIG. 8 shows the housing wall 27 and one of the recesses 28 from FIG. 5 in a sectional view along the line VIII—VIII. The recess 28 is produced by the method described in FIGS. 6 and 7. After formation of the recess 28, a resting surface 33 may be arranged on an end of the recess 28 near the housing cover 1d for receiving a head of a connection element.

FIG. 9 shows a further embodiment of a pressure plate housing 100e according to the invention in which tongues 36 are bent away from a housing cover 1e and radially inward from a housing wall 34. The tongues 36 respectively have flanges 38 with recesses 40 for receiving connection elements for connecting the pressure plate housing 100e to an inertia mass (not shown) of a clutch. FIG. 10 is a sectional view through one of the tongues 36 according to FIG. 9 and shows that the tongues 36 are bent away from the housing cover 1e such that the flanges 38 are further removed from the housing cover 1e than an edge 41 of the housing wall 34 that is remote from the housing cover 1e. Accordingly, only the flanges 38 rest on the inertia mass in the installed state of the pressure plate housing 100e. The result of this arrangement is that no flexural forces are transmitted into the housing wall 34 as a result of the prestress of the pressure plate housing 100e. In contrast to the embodiment according to FIG. 3, the tongues 36 are connected together only by the housing wall 34. The housing cover 1e has recesses 43 in the region of the tongues 36 for the passage of the connection elements.

Figure 11:
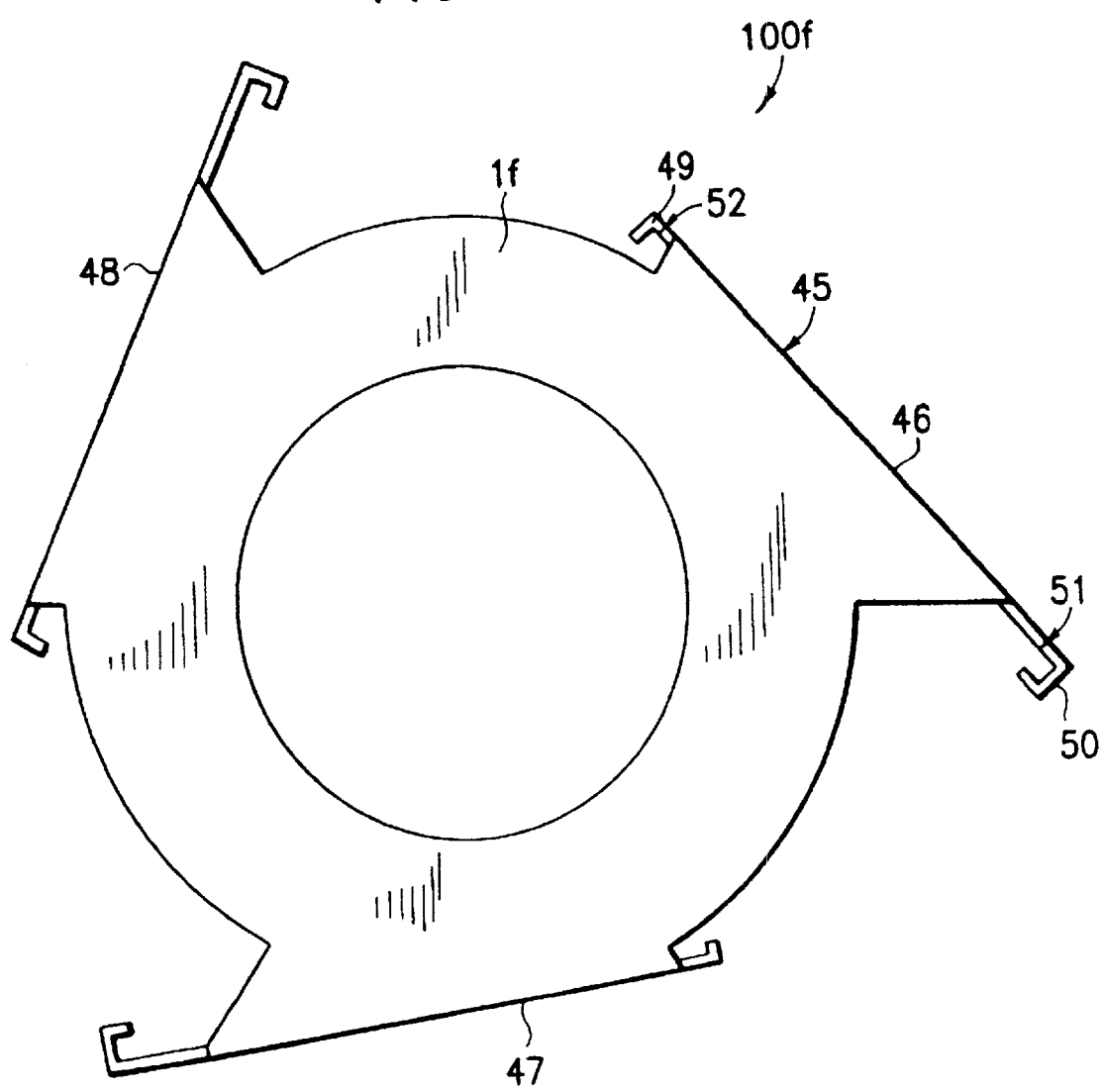
FIG. 11 is a plan view of a pressure plate housing according to another embodiment of the present invention.

FIG. 11 shows a further embodiment of a pressure plate housing 100f according to the invention. The pressure plate housing 100f has a housing wall 45 projecting perpendicularly from the housing cover 1f. The housing wall 45 comprises a plurality of angled sheet metal strips 46–48, similarly to the housing wall 2 of the pressure plate housing 100a shown in FIG. 1. The housing wall 45 of FIG. 11 is specifically shown with three angled sheet metal strips 46, 47, 48. The sheet metal strips 46–48 each have at their ends bent portions 49, 50 for recesses 51, 52 for the connection elements. In each of the sheet metal strips 46, 47, 48, one of the bent portions 49 is a right-angle bend, while the other bent portion 50 includes a U-shaped bend. In this embodiment, the connection elements are only partially surrounded when the pressure plate housing 100f is mounted on an inertia mass. Moreover, FIG. 11 clearly shows that the recess 51 at bent portion 50 is at a larger distance from the center of the housing cover than the recess 52 at bent portion 49. That is, each of the two recesses is arranged on different partial circles. Accordingly, the sheet metal strips 46–48 are arranged to point in a circumferential direction from a radially inner region to a radially outer region. When the pressure plate housing 100f rotates, cooling air is conveyed below the housing cover 1f by the sheet metal strips 46, 47, 48 which function as fan blades.

Figure 12:
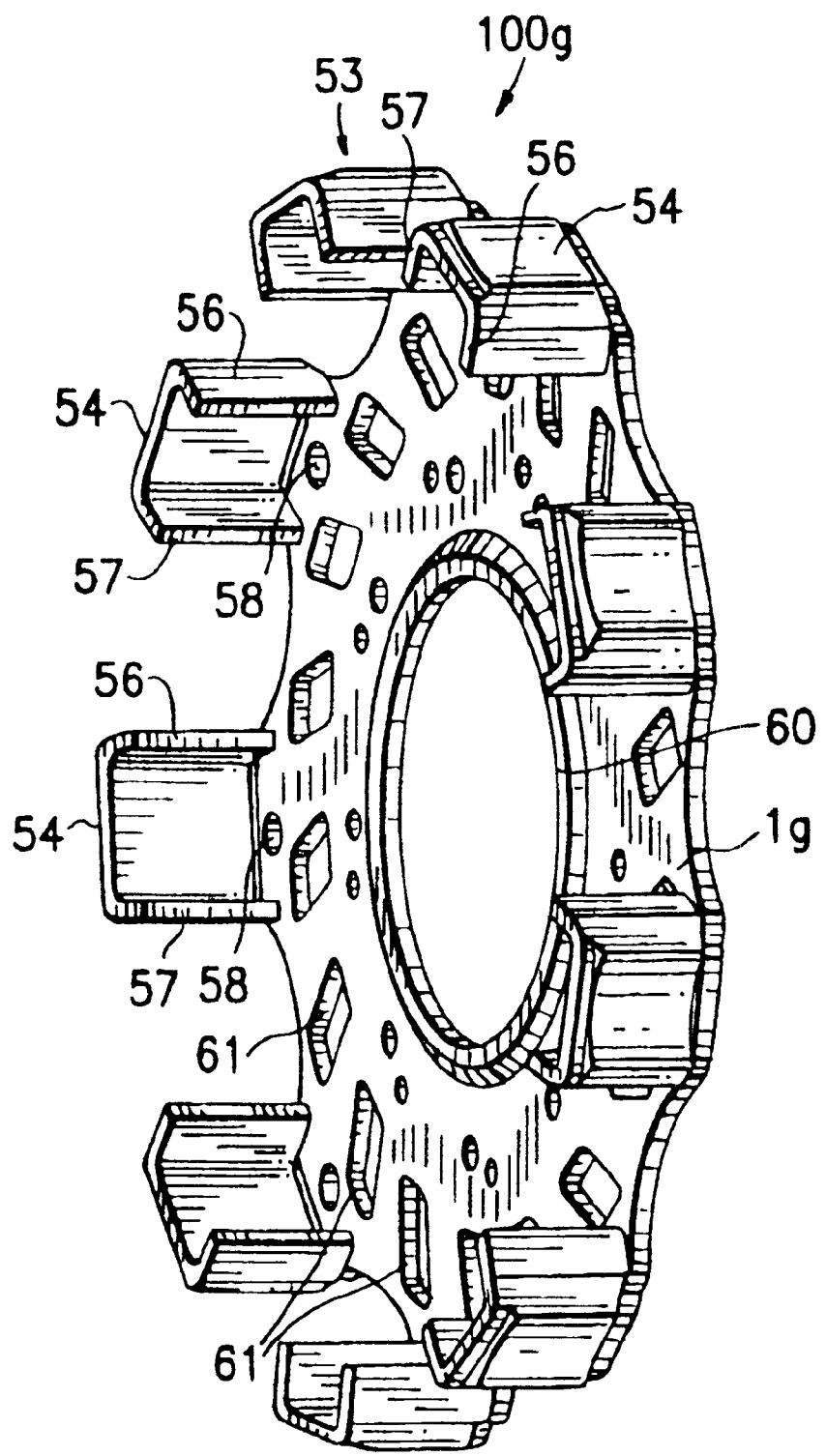
FIG. 12 is a perspective view of a pressure plate housing according to another embodiment of the present invention with a housing wall produced integrally with tongues.

FIG. 12 shows a pressure plate housing 100g according to the present invention in which a housing wall 53 has a plurality of sheet metal strips 54, each having two radially inward-pointing tabs 56, 57. The tabs 56, 57 are arranged such that they are supported on the inertia mass (not shown) when the pressure plate housing 100g is in the installed state and engage laterally around recesses 58 arranged in the housing cover 1g. FIG. 12 also shows that the tabs 56, 57 rest on the housing cover 1g. Accordingly, when the pressure plate housing 100g is prestressed against the inertia mass by connection elements inserted through the recesses 58, the tabs 56, 57 prevent flexural stressing of the housing cover 1g. To increase stability, the housing cover 1g also has a circumferential molding 60 in a radially inner region. Apertures 61 for the passage of guide means for a pressure plate (not shown) of the clutch are arranged in the housing cover 1g.

Figure 13:
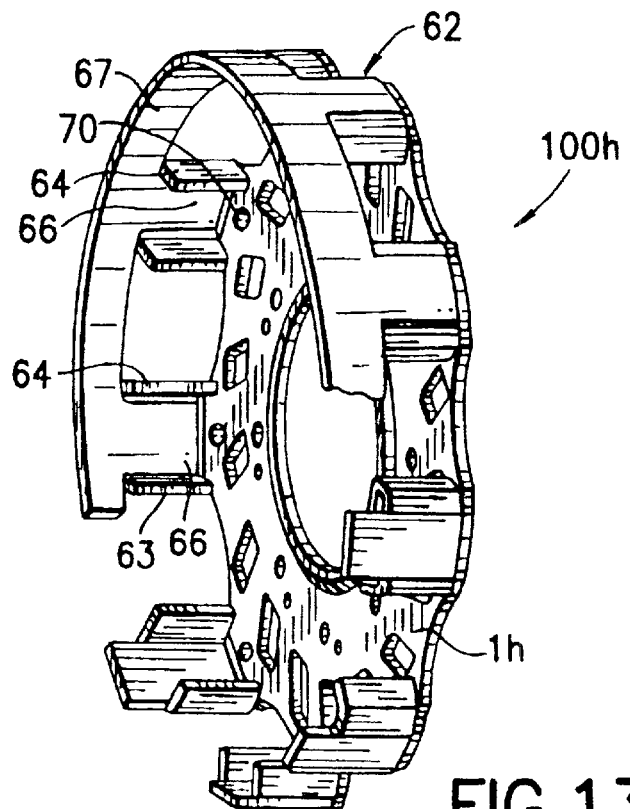
FIG. 13 is a perspective view of a pressure plate housing according to yet another embodiment of the present invention with a circumferential collar designed to be prestressed against a shoulder of the inertia mass.
Figure 14:
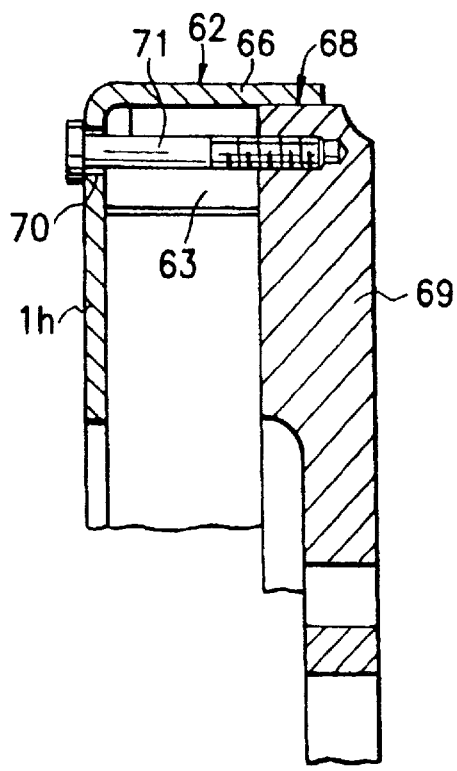
FIG. 14 is a longitudinal section through a partial region of the pressure plate housing according to FIG. 13 in the installed state.

FIG. 13 shows a pressure plate housing 100h according to the present invention in which a housing wall 62 has a plurality of sheet metal strips 66 provided with radially projecting tabs 63, 64. The tabs 63, 64 and the sheet metal strips 66 are designed as described in the case of the housing wall 53 according to FIG. 12. The ends of the sheet metal strips 66 remote from the housing cover 1h are connected to one another by a circumferential edge 67. The circumferential edge 67 is shown by way of example only in the upper region of the pressure plate housing. In FIG. 14, the pressure plate housing 100h is shown connected to an inertia mass 69. The edge 67 of the housing wall 62 is radially prestressed against a shoulder 68 of the inertia mass 69. The edge 67 thus centers the pressure plate housing 100h relative to the inertia mass 69 and generates a frictional fit. The frictional fit facilitates the transmission of a torque from the pressure plate housing 100h to the inertia mass 69. Instead of the circumferentially designed edge 67, a frictional fit with the inertia mass 69 may also be produced by an arrangement in which only a partial region of the sheet metal strips 66, as shown in the lower region of FIG. 13 rest on the shoulder 68 of the inertia mass 69. FIG. 14 also shows a connection element 71 inserted through a recess 70 in a region between the tabs 63, 64 of the housing wall 62. The connection element 71 is designed as a screw and screwed into the inertia mass 69.

The invention is not limited by the embodiments described above which are presented as examples only but can be modified in various ways within the scope of protection defined by the appended patent claims.

I claim:

1. A pressure plate housing for connection with an inertia mass in a clutch of a motor vehicle, comprising:

a disk-shaped housing cover; and a housing wall projecting from said disk-shaped housing cover and having a free end supportable on the inertia mass, said housing wall being shaped for forming a plurality of recesses and being arrangeable for receiving connection elements in said plural recesses for connecting said pressure plate housing to the inertia mass, said housing cover and said housing wall being integrally produced from a formed piece of sheet metal, wherein said housing wall comprises a plurality of sheet metal strips formed as an integral part with said disk-shaped housing cover and angled downward from said disk-shaped housing cover, said plural sheet metal strips being mutually spaced apart along a circumference of said disk-shaped housing cover.

2. The pressure plate housing of claim 1, wherein each of said plural sheet metal strips comprises a pair of radially bent-over tabs arranged for laterally encompassing one of said plural recesses, said pair of radially bent-over tabs having one end supported on the disk-shaped housing cover and another end supportable on the inertia mass.

3. The pressure plate housing of claim 2, wherein said housing wall is radially prestressable against a correspondingly designed shoulder of the inertia mass.

4. The pressure plate housing of claim 1, wherein a radially inner region of said disk-shaped housing cover comprises a circumferential molding.

* * * * *